(12) United States Patent
Hoefelmeyer et al.

(10) Patent No.: US 8,290,779 B2
(45) Date of Patent: Oct. 16, 2012

(54) SYSTEM AND METHOD FOR PROVIDING A MANAGED LANGUAGE TRANSLATION SERVICE

(75) Inventors: Ralph Samuel Hoefelmeyer, Colorado Springs, CO (US); Kristopher A. Pate, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1186 days.

(21) Appl. No.: 11/856,937

(22) Filed: Sep. 18, 2007

(65) Prior Publication Data

US 2009/0076793 A1    Mar. 19, 2009

(51) Int. Cl.
*G10L 21/00* (2006.01)
*G10L 15/00* (2006.01)
*G06F 17/28* (2006.01)
*H04M 1/64* (2006.01)
*H04L 12/28* (2006.01)

(52) U.S. Cl. ......... 704/270.1; 704/2; 704/251; 704/277; 379/88.05; 379/88.06; 370/401

(58) Field of Classification Search ........................ None
See application file for complete search history.

(56) References Cited

U.S. PATENT DOCUMENTS

| | | | | |
|---|---|---|---|---|
| 5,875,422 A | * | 2/1999 | Eslambolchi et al. | 704/3 |
| 7,657,006 B2 | * | 2/2010 | Woodring | 379/88.06 |
| 7,792,276 B2 | * | 9/2010 | Moore et al. | 379/265.12 |
| 7,873,532 B2 | * | 1/2011 | Jones et al. | 705/7.42 |
| 8,103,508 B2 | * | 1/2012 | Lord | 704/270.1 |
| 2002/0169592 A1 | * | 11/2002 | Aityan | 704/2 |
| 2004/0003041 A1 | * | 1/2004 | Moore et al. | 709/204 |
| 2005/0144012 A1 | * | 6/2005 | Afrashteh et al. | 704/277 |
| 2007/0041370 A1 | * | 2/2007 | Cleveland | 370/352 |
| 2008/0221862 A1 | * | 9/2008 | Guo et al. | 704/2 |
| 2010/0121629 A1 | * | 5/2010 | Cohen | 704/2 |

* cited by examiner

*Primary Examiner* — Matthew Sked (57) ABSTRACT

An approach is disclosed for providing a managed language translation service. A request, from a source station, is received, at a switch, to establish a voice call with a destination station. A determination is made whether the request includes an indicator specifying invocation of a translation service managed by a service provider. If the request includes the indicator, the voice call is directed to a gateway that transmits the voice call over a data network to a translation application. The translation application translates, in real-time, speech associated with the voice call from a first language to a second language. The translated speech is transmitted to the destination station.

25 Claims, 7 Drawing Sheets

SYSTEM AND METHOD FOR PROVIDING A MANAGED LANGUAGE TRANSLATION SERVICE

BACKGROUND INFORMATION

Traditionally, obtaining language translation services has required completing various time consuming logistical activities. For example, such activities include scheduling of a human interpreter to be involved with a discussion among multiple participants. This necessitates the coordination of numerous individuals' schedules, which may require significant advance planning. The arduous task of scheduling is particularly onerous when the participants are in different time zones, thereby limiting scheduling freedom. Moreover, accessibility to translation services is significantly hindered, as a typical consumer would need to conduct extensive research to determine a proper translation service. Also, the "overhead" in setting up the service may not warrant the effort, if the session is expected to be relatively short in duration. Furthermore, conventional approaches cannot readily accommodate last minute or spontaneous translation needs, in large part because this overhead presents an impasse.

Therefore, there is a need for an improved approach for providing language translation services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

An apparatus, method, and software for providing real-time language translation are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to Internet Protocol (IP)-based networks and applications, it is contemplated that these embodiments have applicability to other equivalent networks and applications.

Figure 1:
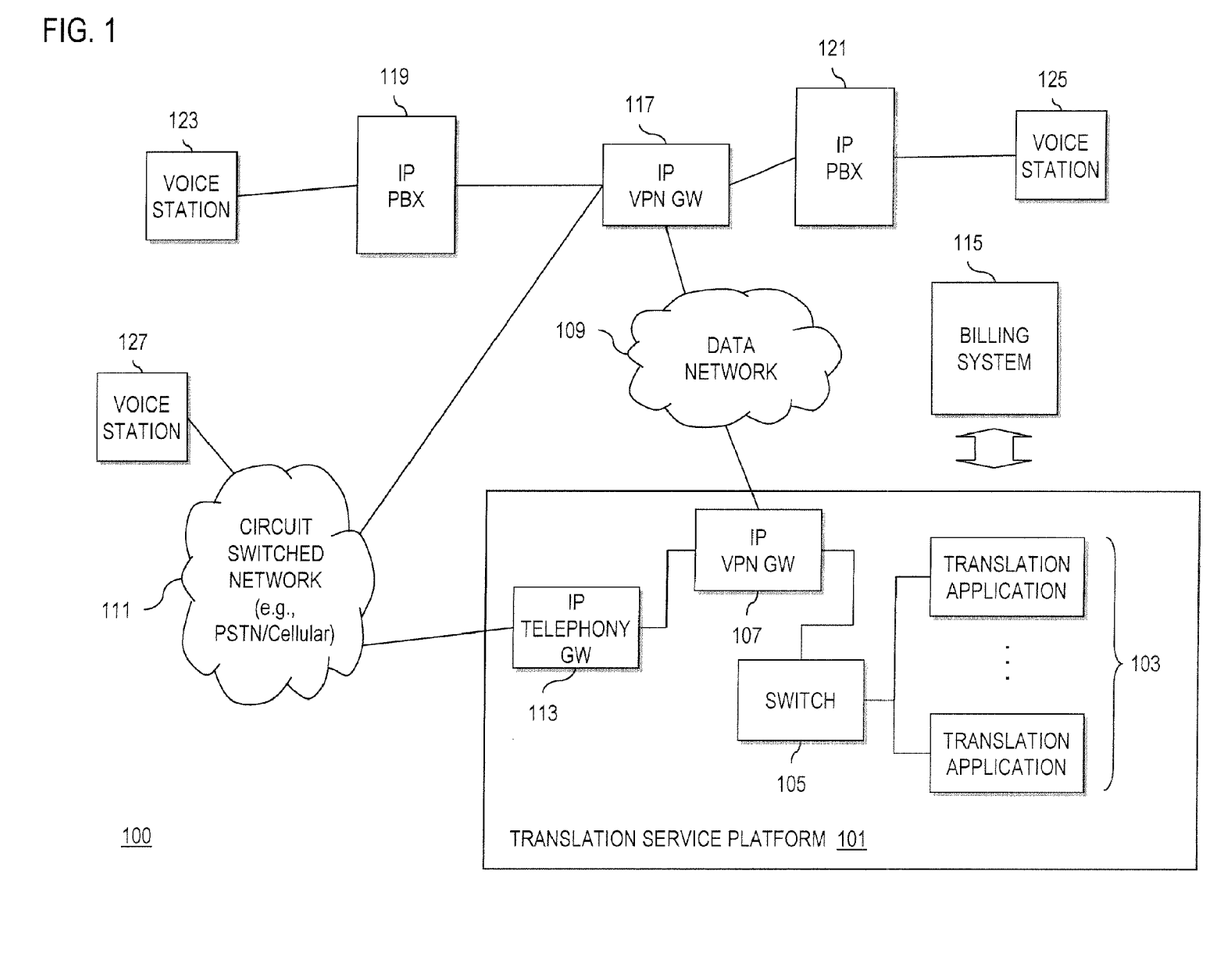
FIG. 1 is a diagram of a translation service platform capable of providing a managed language translation service, according to various exemplary embodiments.

FIG. 1 is a diagram of a translation service platform capable of providing a managed language translation service, according to various exemplary embodiments. For the purposes of illustration, a communication system 100 includes a translation service platform 101 that provides a managed service for real-time translation. The platform 101, in an exemplary embodiment, utilizes one or more translation applications 103, which can be executed by a grid (or cluster) of computers. By way of example, the translation application can be an automated interactive language translator, without the need for interpreters, dictionaries, or memorization prerecorded phrases—such application includes COMPADRE INTERACT™ by SPEECHGEAR™. The application receives speech in one language and outputs speech in a designated language in a real-time voice-to-voice translation of continuous free speech. In this example, the translation applications 103 can be implemented to encompass several different languages with varying combination of source and target languages (e.g., from English-to-Spanish, English-to-French, Spanish-to-English, Spanish-to-French, etc.).

A switch 105 within the translation service platform 101 provides a mapping of voice calls to respective sessions associated with the translation performed by the translation applications 103. The switch 105 also performs load balancing of the voice traffic to ensure real-time performance of the translation service.

The translation service platform 101 utilizes, in one embodiment, an Internet Protocol (IP) virtual private network (VPN) gateway (GW) 107 for securely communicating over a data network 109. Alternatively, the translation service platform 101 can communicate over a circuit switched network 111, e.g., a public switched telephone network (PSTN) or a cellular network, using an IP telephony gateway 113.

As part of the managed service, a service provider maintains the translation service platform 101 and employs a billing system 115 to invoice its subscribers. The billing system 115 operates in conjunction with the translation applications 103 to accurately track usage of the service and to generate invoices based on the usage. The billing system 115 enables payment on demand or pre-paid. The billing process is more fully described in FIG. 4.

As shown, the translation service platform 101 can establish a virtual private network (VPN) connection with IP VPN GW 117. The IP VPN gateways 107, 117 create a secure tunnel through the data network 109 to enable sharing of the resources of the data network 109 to exchange voice traffic. The VPN can operate according to a best-effort or a negotiated Service Level Agreement (SLA). Although FIG. 1 shows a point-to-point connection, the VPN may employ other topologies. The IP VPN GW 117 serves IP private branch exchanges (PBXs) 119, 121. The IP PBX 119 connects to one or more voice stations 123 to provide telephony features and services. As a private branch exchange, the IP PBX 119 provides a telephony switching system within an organization (business or enterprise). The IP PBX 119 switches calls between Voice over IP (VoIP) voice stations (of which only one, voice station 123, is shown) on local lines and permits such stations to share external phone lines. In addition, the IP PBX 119 can switch calls between a VoIP voice station and a traditional POTS voice station, or between two POTS voice stations.

The IP PBX 121 provides telephony features to voice station(s) 125, such as call transfer, call forwarding, call pick-up, abbreviated dialing, etc. Under this scenario, the voice stations 123, 125 are VoIP stations, which can be actual physical devices or virtual ("soft") interface within a computing device. The computing devices can include desktop personal computers, workstations, web appliances, personal digital assistants (PDAs), palm computers, etc.

In addition, the communication system 100 permits users (or subscribers) with POTS (Plain Old Telephone Service) voice stations 127 to partake in the real-time language translation service. Under the arrangement of FIG. 1, the voice stations 123, 125, and 127 can permit the users to communicate in different languages without regard to scheduling issues, as the translation service platform 101 does not rely on a human interpreter. That is, no human intervention is required to sustain the translation service.

According to one embodiment, the translation service is easily invoked based on the dialing plan, as next explained.

Figure 2:
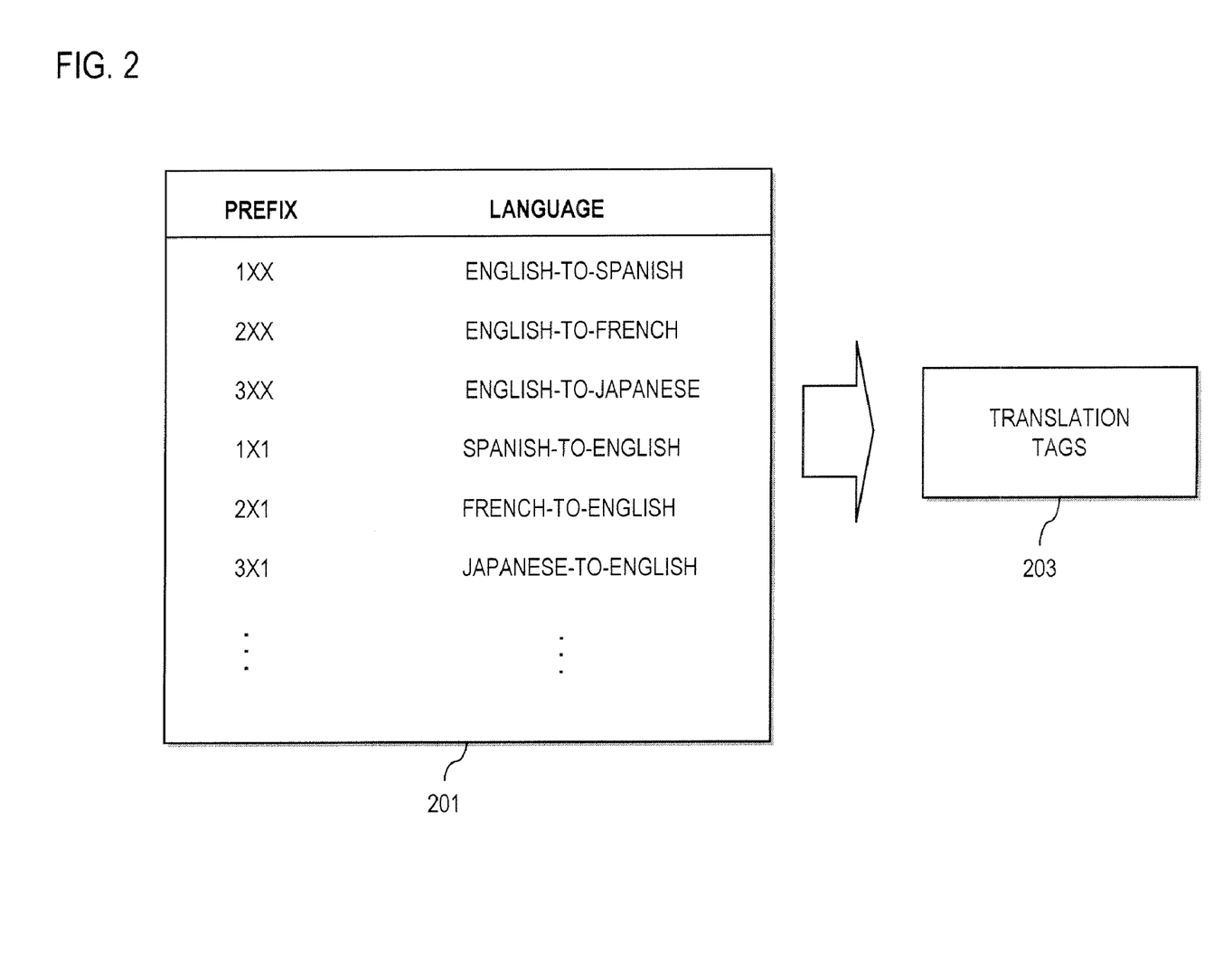
FIG. 2 is a diagram of a dialing plan for providing real-time language translation, according to an exemplary embodiment.

FIG. 2 is a diagram of a dialing plan for providing real-time language translation, according to an exemplary embodiment. A table 200 of translation prefixes is employed to specify that real-time translation service is requested. These prefixes can uniquely identify the particular languages involved in the translation. For instance, the dialing prefix of "1xx" conveys that the user seeks to have speech translated from English to Spanish. It is noted that the prefixes serve as indicators to notify the network (or application or protocol) that special treatment of the voice call is requested (i.e., invoke language translation service). These indicators need to be maintained, in substance, to identify the particular languages involved. Accordingly, the indicators can change form depending on the system and application that is processing the information. For example, at some point in the call flow, the prefix may need to be converted to a translation tag 203 to indicate which of the translation applications 103 is to handle the particular voice call.

The operation of the translation service platform 101 is explained below.

Figure 3A:
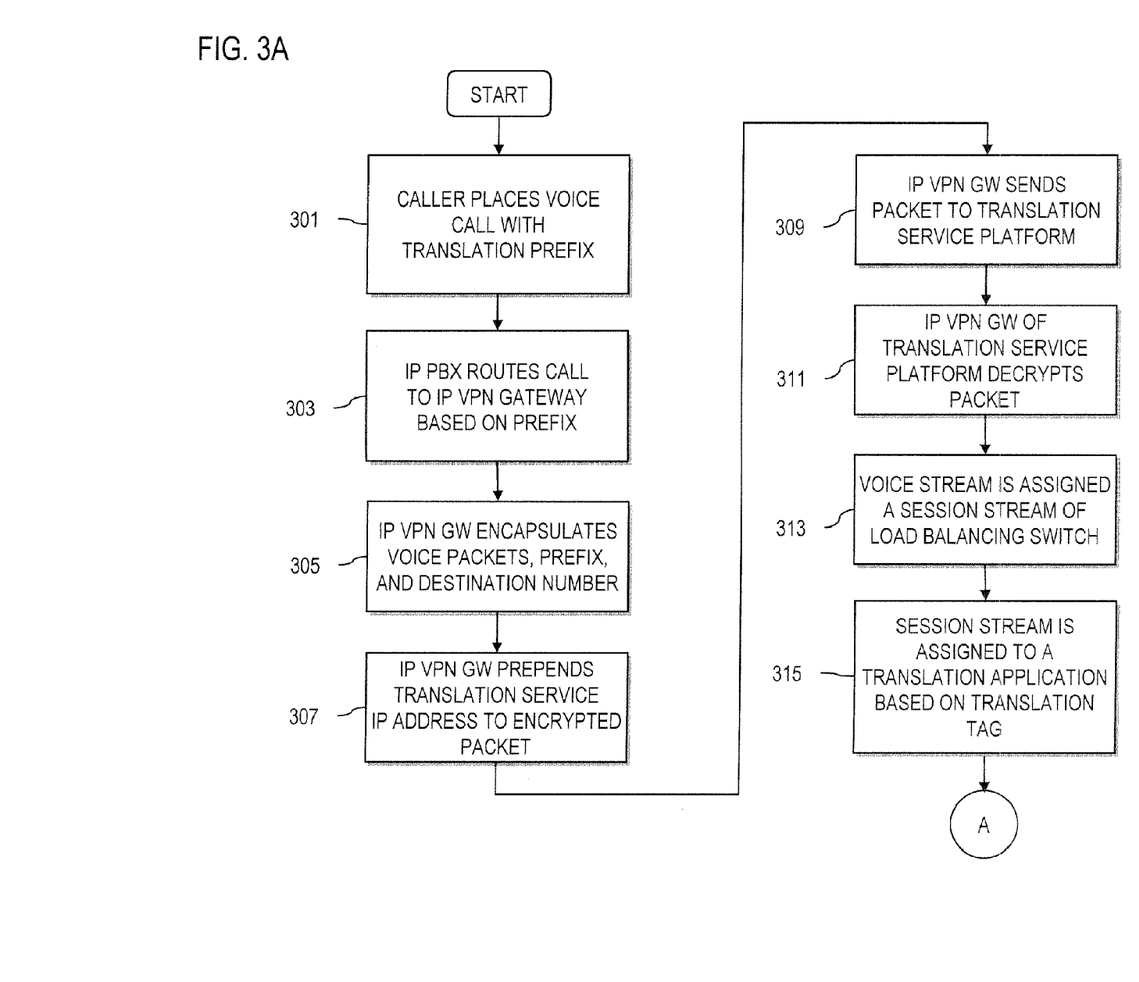
FIGS. 3A and 3B are flowcharts of a process for providing real-time language translation, according to an exemplary embodiment.
Figure 3B:
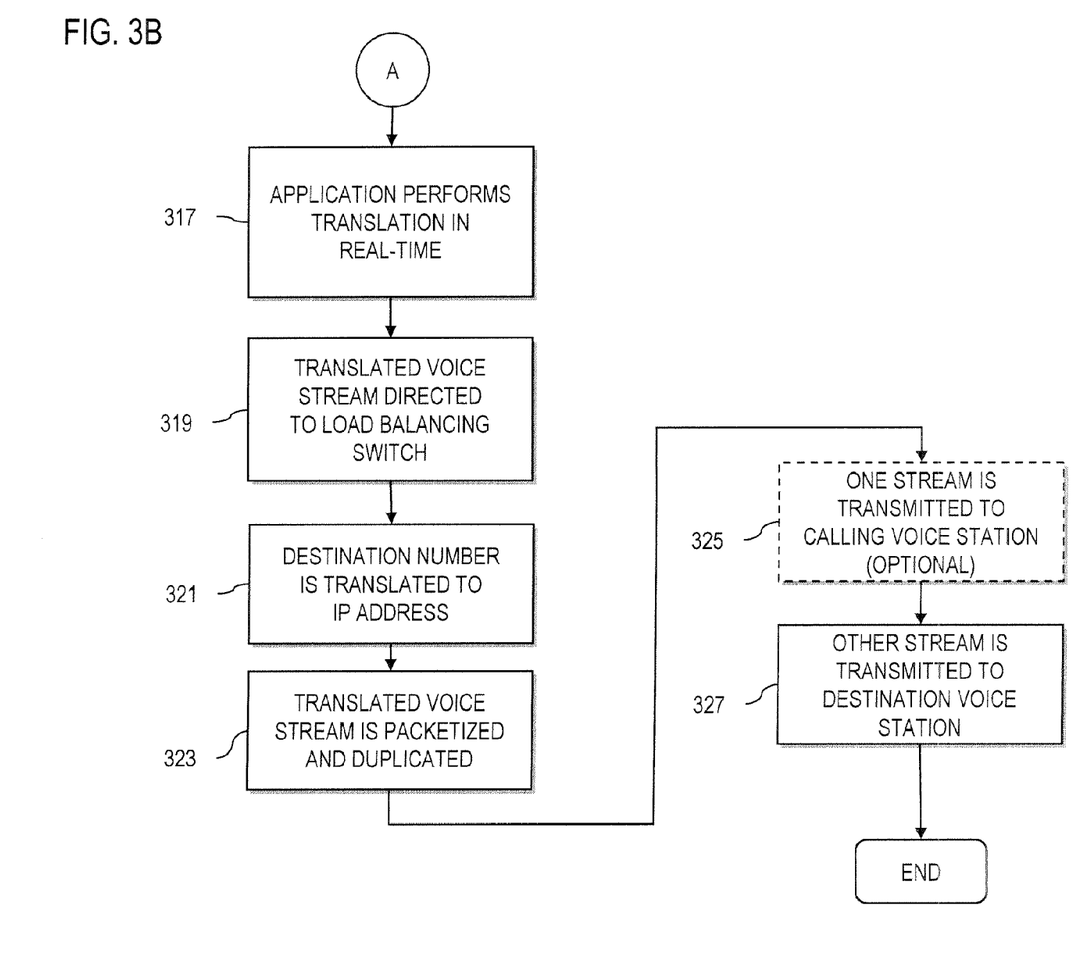

FIGS. 3A and 3B are flowcharts of a process for providing real-time language translation, according to an exemplary embodiment. In step 301, a caller (or calling party), who is an English speaker uses the voice station 123 (source station), for example, to place a voice call to a called party on the voice station 127 (destination station). For the purposes of explanation, the called party is a Spanish speaker. Thus, the dialed digits that is input by the caller includes a translation prefix for a given language—e.g., "1xx" corresponding to English-to-Spanish. Under this scenario, the voice station 123, as a source station, is served by an IP private branch exchange (PBX) 119, which examines the dialed digits for a translation prefix and routes the call, per step 303, to the IP VPN gateway 117 upon detecting the existence of the prefix (e.g., "1xx").

In step 305, the IP VPN gateway 117 encapsulates the voice packet, the translation prefix, and the destination number in an encrypted packet. The IP VPN gateway 117 then prepends, as in step 307, the translation service IP address to the encrypted packet. Next, the encrypted packet is then sent over a data network 109 to the translation service platform 101, as in step 309. A router (not shown in the system of FIG. 1), for instance, can receive the packet, and forward to the IP VPN gateway 107 of the translation service platform 101.

Next, the IP VPN gateway 107 decrypts the packet, the translation prefix and destination number, per step 311. The decrypted voice packet is part of a voice stream, which is assigned a session stream in the load balancing switch 105 (step 313). The session stream is assigned to a computer within the grid (i.e., transaction application) for translation based on the translation tag, per step 315.

In step 317, the voice stream is translated by the appropriate translation application 103, and directed back to the load balancing switch 105 (per step 319). At this juncture, the destination number is translated to an IP address, as in step 321. In step 323, the voice stream is packetized and duplicated. One duplicate stream is sent to the originating voice station 123 using the network 109, so the caller (originator) can hear the translation, per step 325. In step 327, the second stream is sent to the destination voice station 127. It is noted that the duplicate stream forwarded to the originating voice station 123 is merely optional.

According to one embodiment, the communication between the originating voice station 123 and the destination voice station 127 is in a half duplex mode—i.e., only one party speaks at a time, in a push to talk manner to prevent overlap of the translation streams.

Additionally, it is contemplated that the translation service platform 101 can support text-to-speech and speech-to-text conversions. Such functions can be integrated with the translation application 103, for example. Alternatively, separate devices or modules (e.g., Digital Signal Processors) can be utilized to provide text-to-speech and speech-to-text conversions, and can reside in various components within the system 100. For example, text-to-speech and speech-to-text processors can be deployed in the IP telephony gateway 113 or the switch 105. These capabilities permit a user who is confined to text-based commmunications, e.g., computing system (not shown), such as a desktop computer, personal digital assistant (PDA), etc., to obtain the translation service.

Figure 4:
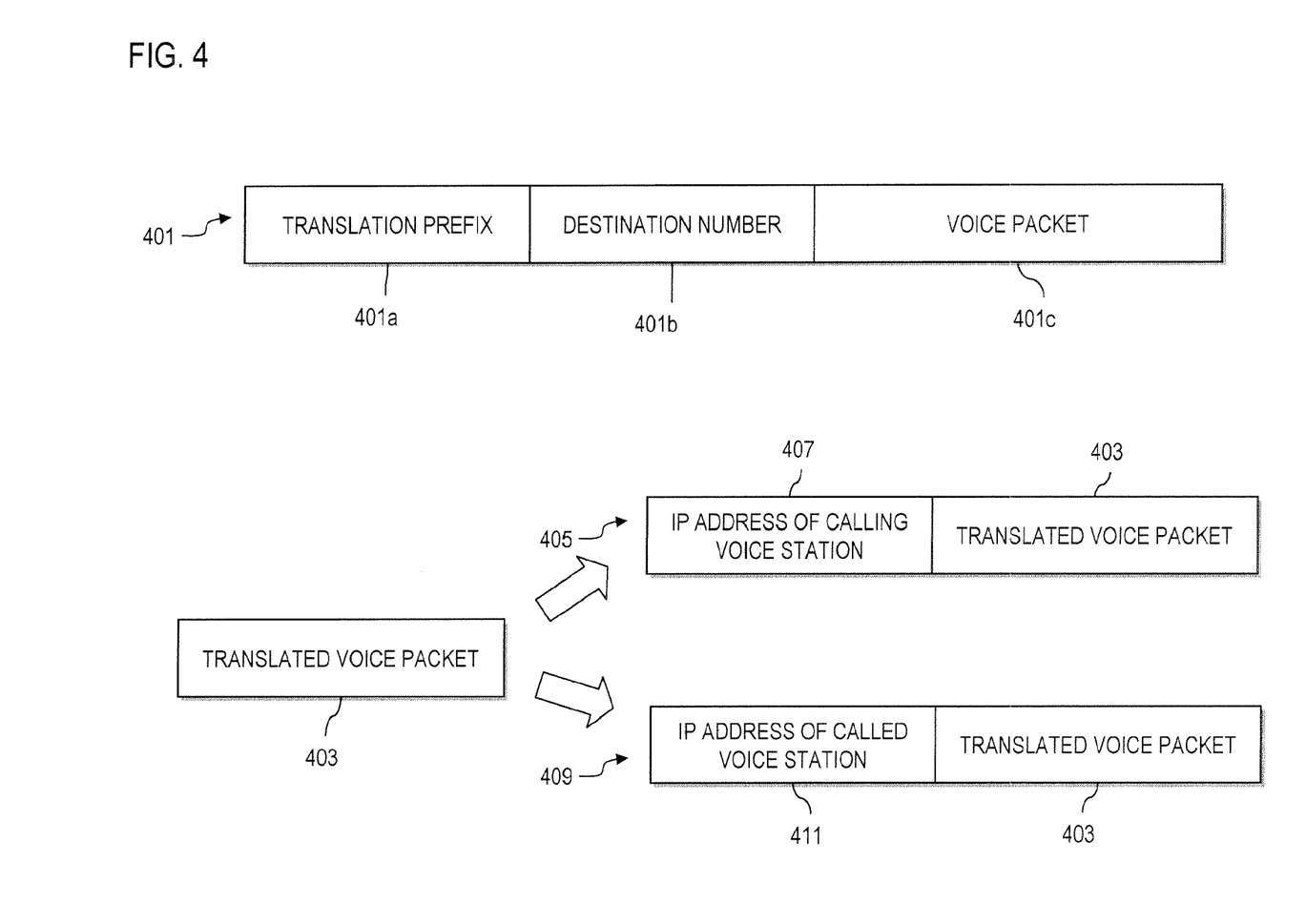
FIG. 4 is a diagram of message formats used in the real-time language translation process of FIGS. 3A and 3B, according to an exemplary embodiment.

FIG. 4 is a diagram of message formats used in the real-time language translation process of FIGS. 3A and 3B, according to an exemplary embodiment. Message 401 shows an example of an encapsulated packet that is generated by the IP VPN gateway 117. The message 401 includes a translation prefix field 401a, a destination number 401b, and one or more voice packets associated with the voice call.

As shown, a translated voice packet 403 undergoes duplication after the translation process. Specifically, a message 405 that is destined for the originating voice station 123 includes a network address field 407 for the IP address of the calling voice station 123 and the translated voice packet 403. A message 409 containing the duplicate translated voice packet 403 includes a network address field 411 to specify the IP address of the called voice station 127.

Another aspect of the managed translation service pertains to the capability to accurately and timely bill for the service, as next described.

Figure 5:
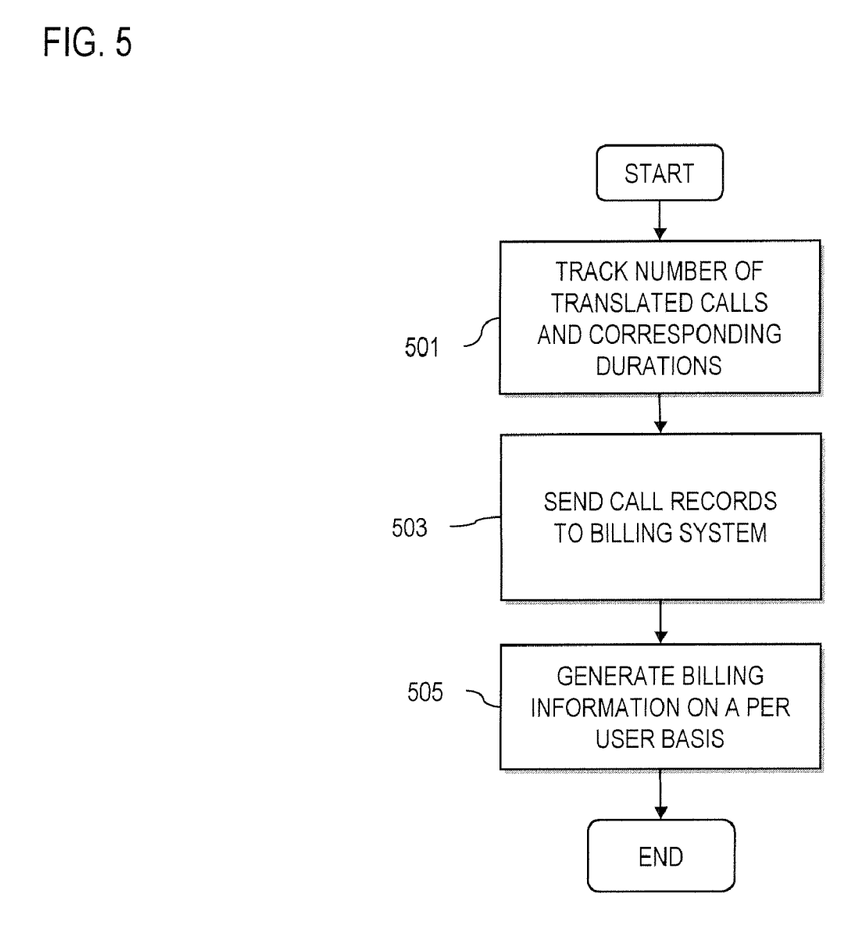
FIG. 5 is a flowchart of a billing process for a real-time language translation service, according to an exemplary embodiment.

FIG. 5 is a flowchart of a billing process for a real-time language translation service, according to an exemplary embodiment. In step 501, the grid computers that loaded with the translation applications 103 can also keep track of how many calls and the duration of the calls (i.e., call records) translated on a per customer basis, which is reported to a consolidation application (not shown) on the grid. These call records, in form of consolidated information, are sent to the billing system 115, as in step 503. Next, in step 505, the billing system 115 generates billing information.

As mentioned, a variety of payment methods can be used, including on-demand or pre-paid. In an alternative embodiment, a subscription service can be implemented, whereby the subscribers pay a fixed and/or variable monthly charge for the managed translation service.

The above described processes relating to managed language translation services can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
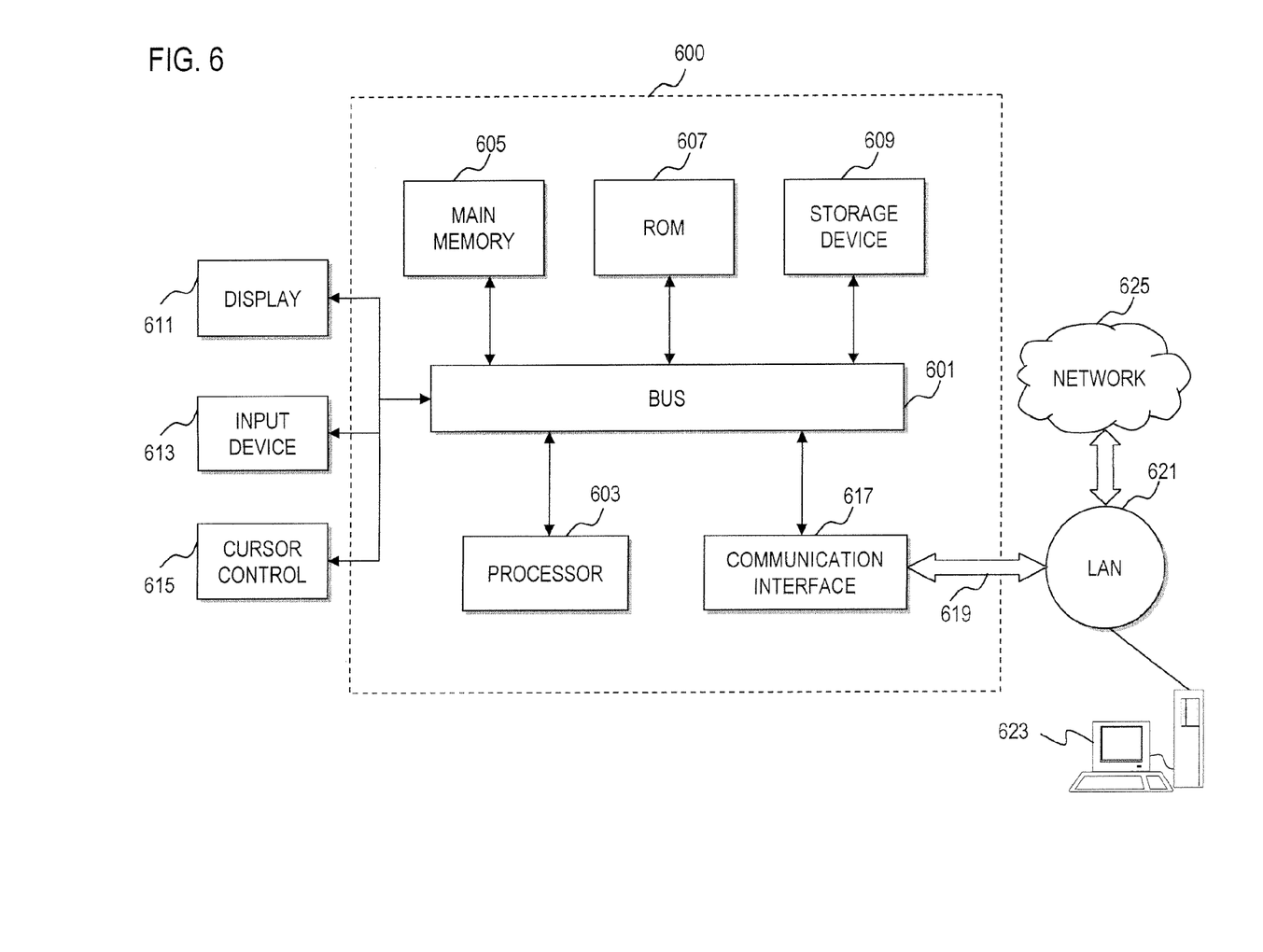
FIG. 6 is a diagram of a computer system that can be used to implement various exemplary embodiments.

FIG. 6 illustrates a computer system 600 upon which an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, haptic devices, eye tracking systems, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the exemplary embodiment. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   receiving, by a telecommunications switch, a voice call placed from a source station to a destination station;
   determining that the voice call includes a translation indicator specifying invocation of a translation service managed by a service provider;
   based at least in part on the determination, directing the voice call to a gateway configured to route the voice call over a data network to a translation platform, wherein the translation platform is configured to translate, in real-time, speech associated with the voice call from a first language to a second language; and
   transmitting the translated speech to the destination station.

2. A method according to claim 1, further comprising:
   transmitting the translated speech to the source station concurrent with the transmission of the translated speech to the destination station.

3. A method according to claim 1, wherein the voice call is represented by a plurality of voice packets, the method further comprising:
   encrypting the voice packets; and
   prepending a translation service address to the encrypted packets for forwarding to the translation platform, wherein the translation platform is further configured to decrypt the voice packets.

4. A method according to claim 3, further comprising:
   assigning a session stream associated with a load balancing switch to the voice packets based on the translation indicator.

5. A method according to claim 1, further comprising:
   converting a destination number of the destination station to an Internet Protocol (IP) address.

6. A method according to claim 1, wherein the voice call is placed in form of a sequence of digits associated with a dial plan, and the translation indicator comprises a prefix.

7. A method according to claim 1, wherein the translation indicator comprises one of a plurality of values corresponding to a particular language translation.

8. A method according to claim 1, wherein the source station and the destination station communicate in half duplex.

9. A method according to claim 1, wherein the translation platform is configured to track a number of voice calls and associated durations as translation call records, the translation call records being submitted to a billing system.

10. A method according to claim 1, wherein the voice call is placed over one of either a circuit switched telephony network or a packetized voice network.

11. An apparatus comprising:
    a communication interface configured to receive a voice call placed from a source station to a destination station; and
    a processor coupled to the communication interface, wherein the processor is configured to,
    determine that the voice call includes a translation indicator specifying invocation of a translation service managed by a service provider,
    based at least in part on the determination, directing the voice call to a gateway configured to route the voice call over a data network to a translation platform, wherein the translation platform is configured to translate, in real-time, speech associated with the voice call from a first language to a second language; and
    wherein the communication interface is further configured to transmit the translated speech to the destination station.

12. An apparatus according to claim 11, wherein the translated speech is transmitted to the source station concurrent with the transmission of the translated speech to the destination station.

13. An apparatus according to claim 11, wherein the voice call is represented by a plurality of voice packets,
    wherein the gateway is further configured to encrypt the voice packets, and to prepend a translation service address to the encrypted packets for forwarding to the translation platform, and
    wherein the translation platform is further configured to decrypt the voice packets.

14. An apparatus according to claim 13, wherein a session stream associated with a load balancing switch is assigned to the voice packets based on the translation indicator.

15. An apparatus according to claim 11, wherein a destination number associated with the destination station is converted to an Internet Protocol (IP) address.

16. An apparatus according to claim 11, wherein the voice call is placed in form of a sequence of digits associated with a dial plan, and the translation indicator comprises a prefix.

17. An apparatus according to claim 11, wherein the translation indicator comprises one of a plurality of values corresponding to a particular language translation.

18. An apparatus according to claim 11, wherein the source station and the destination station communicate in half duplex.

19. An apparatus according to claim 11, wherein the translation platform is configured to track a number of voice calls and associated durations as translation call records, the translation call records being submitted to a billing system.

20. An apparatus according to claim 11, wherein the voice call is placed over one of either a circuit switched telephony network or a packetized voice network.

21. A system comprising:
    a telephony switch node configured to receive a voice call placed from a source station to a destination station, and to determine that the voice call includes a translation indicator specifying invocation of a translation service managed by a service provider;
    a first gateway in communication with the telephony node, wherein the telephony switch node is further configured to, based at least in part on the determination, direct the voice call to the first gateway, the first gateway being configured to route the voice call over a data network;
    a second gateway configured to receive the voice call from the first gateway; and
    a translation service platform coupled to the second gateway, wherein the translation service platform is configured to translate, in real-time, speech associated with the voice call from a first language to a second language, and wherein the translated speech is transmitted to the destination station.

22. A system according to claim 21, wherein the translated speech is transmitted to the source station concurrent with the transmission of the translated speech to the destination station.

23. A system according to claim 21, wherein the voice call is represented by a plurality of voice packets,
wherein the first gateway is further configured to encrypt the voice packets, and to prepend a translation service address to the encrypted packets for forwarding to the translation service platform, and
wherein the translation service platform is further configured to decrypt the voice packets.

24. A system according to claim 23, wherein the translation service platform includes a load balancing switch, and a session stream associated with the load balancing switch is assigned to the voice packets based on the translation indicator.

25. A system according to claim 21, wherein,
the voice call is placed in the form of a destination number associated with the destination station, and
the translation indicator comprises a prefix of a value corresponding to a particular language translation.

* * * * *